United States Patent [19]
Takimoto

[11] Patent Number: 4,517,501
[45] Date of Patent: May 14, 1985

[54] ROTATION CONTROL SYSTEM

[75] Inventor: Hiroyuki Takimoto, Kanagawa, Japan

[73] Assignee: Canon Kabushiki Kaisha, Tokyo, Japan

[21] Appl. No.: 449,614

[22] Filed: Dec. 14, 1982

[30] Foreign Application Priority Data

Dec. 15, 1981 [JP] Japan ................................ 56-203342

[51] Int. Cl.³ .............................................. G05B 5/00
[52] U.S. Cl. .................................... 318/314; 318/445; 318/447; 318/452; 318/454
[58] Field of Search ............... 318/308, 310, 314, 447, 318/445, 452, 453, 454; 361/83, 89, 94, 97; 330/84, 124 R, 147, 278, 280, 281, 295; 360/73

[56] References Cited
U.S. PATENT DOCUMENTS 4,162,457  7/1979  Grodinsky ..................... 330/278 X
4,422,049 12/1983  Akagiri et al. ................. 330/281 X Primary Examiner—Ulysses Weldon
Attorney, Agent, or Firm—Toren, McGeady, Stanger

[57] ABSTRACT

A rotation control system including speed control feedback automatic speed control apparatus for controlling the rotation speed of a rotator to a predetermined speed, feedback automatic phase control apparatus for controlling the rotation phase of the rotator to a predetermined phase, and changeover apparatus for changing over at least one of the loop gain of the speed control apparatus and a loop gain of the phase control apparatus in a changeover period, and changeover control apparatus for controlling the changeover apparatus in association with the rotation of the rotator.

37 Claims, 11 Drawing Figures

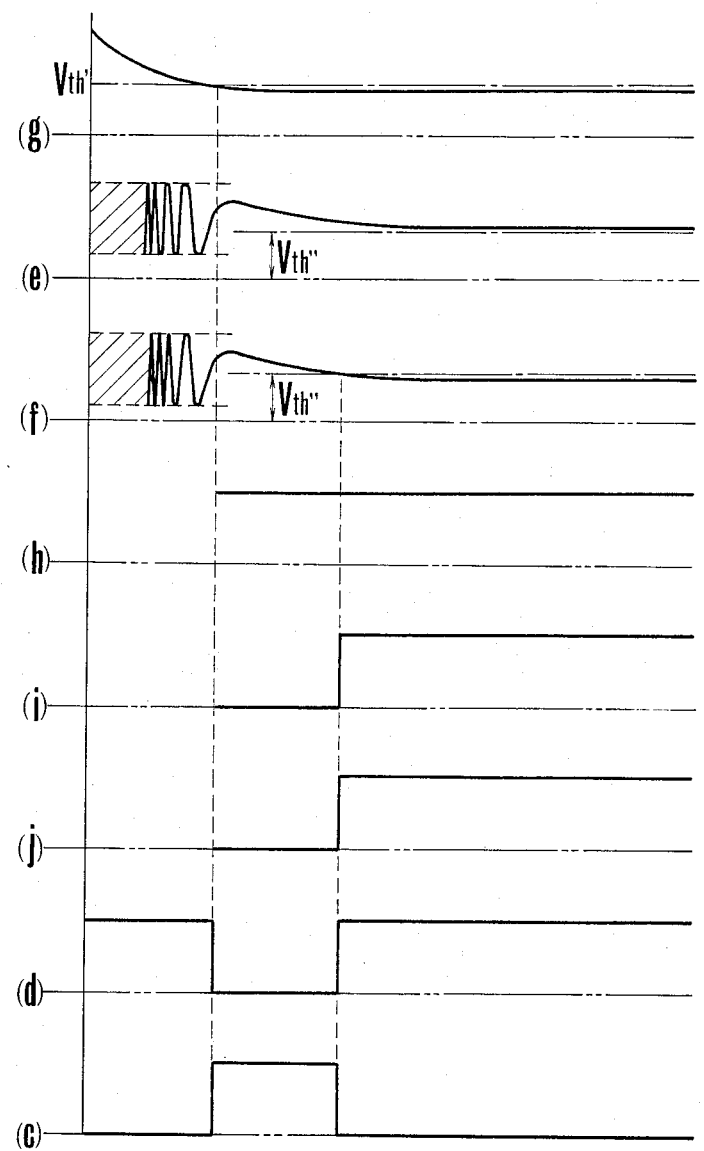

ROTATION CONTROL SYSTEM

BACKGROUND OF THE INVENTION

1. Field of the Invention

This invention relates to rotation control systems, and more particularly to rotation control systems capable of controlling the speed and phase of rotation of a rotator.

2. Description of the Prior Art

In the following this specification is described by taking, for example, a system for controlling the operation of a rotary cylinder used in the rotary head type magnetic video recording and reproducing apparatus (hereinafter referred to as "VTR").

FIG. 1 illustrates an example of the system for controlling the operation of a rotary cylinder as the rotator in VTR. There are shown a magnetic tape 1, a magnetic head 2 for recording and reproducing video signals, a rotary cylinder 3 holding the magnetic head 2, an electric motor 4 for driving the cylinder 3, a magnet 5 for phase detection incorporated in the motor 4, a head 6 for phase detection by detecting the position of the magnet 5, a signal generator 7 for producing a signal representing the frequency proportional to the number of revolutions of the motor 4, a video signal inlet 8, a vertical-hold separation circuit for separating vertical synchronizing signals from the video signals, a control head 10 by which when recording the video signals the vertical synchronizing signals separated by a vertical-hold separation circuit 9 are recorded as the control signal, and when reproducing the video signals, the control signal is reproduced, a control track 11 on which the control signal is recorded, changeover switches 12 and 13, a square wave forming circuit 14, a trapezoidal wave forming circuit 15, a pulse shaping circuit 16, a delay circuit 17, a charging and discharging circuit 18, sample and hold circuits 19 and 20, and a control circuit 21 for amplifying the outputs of the sample and hold circuits 19 and 20 in appropriate combination.

FIG. 2 is wave form diagrams drawn to a common time scale representing signals appearing at various points, (a) through (j), in the system of FIG. 1. The operation will next be described below. With regard first to the speed control system, the output (a) of the signal generator 7 is applied to the pulse shaping circuit 16, and the pulse shaping circuit produces a pulse signal (b) in synchronization with the output (a). The pulse signal (b) is applied as sampling pulses to the sample and hold circuit 20 and also to the delay circuit 17 in which the input signal is delayed by a minute time. The output of the delay circuit 17, or the delayed pulses (c) are applied as trigger pulses to discharge the charging and discharging circuit 18. The charging and discharging circuit 18 comprises a charging current source, a condenser, and a discharging circuit to be discharged when the trigger pulses are given thereto. Then, the output (d) of the charging and discharging circuit 18 is applied to the sample and hold circuit 20 where sampling is performed by the aforesaid pulse signal (b). Then, the output (e) of the sample and hold circuit 20 is applied as a speed error voltage to the control amplifier 21.

Next, explanation is given to the phase control system. The PG head 6 produces a pulse signal (f) (hereinafter referred to as "PG pulses") in synchronization with the motor 4, which is then applied to the square wave forming circuit 14. The square wave forming circuit 14 produces square waves (g) with their leading and trailing edges synchronized with the positive and negative going PG pulses (f) respectively. The trapezoidal wave forming circuit 15 produces trapezoidal waves (h) in synchronization with the square waves (g), and the trapezoidal waves (h) are applied to the sample and hold circuit 19. On the other hand, the vertical synchronizing signal separated from the video signal by the vertical-hold separation circuit 9 is recorded as the control signal in the control track on the magnetic tape 1 through the control head 10 when recording the video signal, and is also applied as the sampling pulses (i) to the sample and hold circuit 19. Also when reproducing the video signal, the thus-recorded control signal is reproduced from the control track, and the reproduced control signal is applied as the sampling pulse (i) to the sample and hold circuit 19. In the sample and hold circuit 19, the trapezoidal waves (h) are sampled by the aforesaid sampling pulses (i). Then, the output of the sample and hold circuit 19 is applied to the control amplifier 21.

FIG. 3 is an electrical circuit diagram illustrating an example of a conventional control amplifier 21 in the system of FIG. 1. In FIG. 3, Reference symbols A1–A3 identify operational amplifiers; reference symbols R, R1 and R2 identify resistors; reference symbol Q identifies a transistor. Also in the following, an output voltage of the operational amplifier A1 is denoted as V1, an output voltage of the operational amplifier A2 is denoted as V2, and an output voltage of an emitter follower including the transistor Q and the operational amplifier A3, which is applied to a motor 4, is identified as $V_0$. This motor 4 is the same as that illustrated in FIG. 1.

The operation of this control amplifier 21 is as follows: The output (e) of the sample and hold circuit 20 and the output (j) of the sample and hold circuit 19 are applied as a speed control voltage (hereinafter referred to as "Vs") and a phase control voltage (hereinafter referred to as "Vp") respectively to terminals 22 and 23. To a terminal 25 there is provided a constant voltage Vcc, and to a terminal 24 there is provided a half of this constant voltage Vcc, or constant voltage ½Vcc. FIG. 4 is a characteristic curve representing the relationship between the number of revolutions (hereinafter referred to as "N") of the cylinder 3 and the speed control voltage Vs. It is so set that when the cylinder 3 is rotating at a prescribed speed (hereinafter referred to as "$N_0$"), the speed control voltage Vs becomes ½Vcc. Also FIG. 5 is a characteristic curve representing the relationship of the phase difference (hereinafter referred to as "$\theta$") between the phase of rotation of the cylinder 3 and the aforesaid vertical synchronizing signal or reproduced control signal with the phase control voltage Vp. In FIG. 5, the starting point in time $\theta_0$ is taken at a prescribed value (hereinafter referred to as "$\theta_0$") of the aforesaid phase difference. It is at this time that the phase control voltage Vp becomes ½Vcc. It is set such that the motor 4 has the number of revolutions $N_0$ when the voltage applied thereon is ½Vcc. Here the number of revolutions $V_0$ is expressed by the following formula in terms of the speed control voltage Vs and the phase control voltage Vp:

$$V_0 = \frac{1}{2R}\left\{ (R + R1)Vs + (R + R2)Vp - \frac{1}{2} \cdot Vcc(R1 + R2) \right\} \quad (1)$$

Here when $V_s = \frac{1}{2}V_{cc}$ and $V_p = \frac{1}{2}V_{cc}$, that is, when the drum 3 rotates with the phase difference $\theta_0$ and the number of revolutions N $N_0$, from formula (1) we have $V_0 = \frac{1}{2}V_{cc}$. Thus, the number of revolutions of the motor 4 is adjusted to that prescribed value. If the number of revolutions N increases from $N_0$ by $\Delta N$, or the speed of rotation becomes faster, as $\Delta V_s/\Delta N = -a$ is assumed at $N = N_0$ in FIG. 4, it follows from formula (1) that $$V_0 = \frac{1}{2} V_{cc} - \frac{a\Delta N}{2R}(R + R1) \quad (2)$$

In other words, the voltage $V_0$ applied to the motor 4 lowers with the result that the number of revolutions N decreases to $N_0$. And in similar analogy, if the number of revolutions N is decreasing, the number of revolutions N tends to increase to $N_0$. Next, if the phase $\theta$ is in advance $\Delta\theta$ from $\theta_0$, as $\Delta V_p/\Delta\theta = -b$ is assumed at $\theta = \theta_0$ in FIG. 5, it follows from formula (1) that $$V_0 = \frac{1}{2} V_{cc} - \frac{b\Delta\theta}{2R}(R + R2) \quad (3)$$

In other words, the voltage $V_0$ is applied to the motor 4 lowers. As a result, the phase $\theta$ tends to delay approaching $\theta_0$. And in a similar analogy, if the phase $\theta$ is in delay, the phase $\theta$ tends to advance to $\theta_0$. In such a manner, the speed and phase of rotation are controlled.

Let us next explain the transient characteristics at the starting time. We will assume that the motor 4 is initially at a standstill and then actuated therefrom to start rotation. As the number of revolutions of the motor 4 increases, the speed control voltage Vs approaches $\frac{1}{2}V_{cc}$. And during this time, for the speed control voltage Vp, there takes place large variations in the voltage with frequencies equal to the differences between the instantaneous angular frequency of the cylinder 4 and the frequency of the sampling pulses (i). In general, however, the resistor R1 is larger than the resistor R2. That is, the gain of the speed control system is larger than that of the phase control system. Therefore, it may be considered that after the start of motion of the cylinder 3 the speed control system mainly works until the number of revolutions N reaches $N_0$.

Assuming that when the number of revolutions nears $N_0$, the $\theta$ goes an angle $\Delta\phi$ ahead of the $\theta_0$, then if the resultant voltage $V_0$ applied on motor 4 takes the following value derived from formula (3), or $$V_0 = \frac{1}{2} V_{cc} - \frac{b\Delta\phi}{2R}(R + R2) \quad (4)$$

no problem will arise. On the other hand, however, lowering of the voltage $V_0$ of formula (4) on the motor (4) causes the number of revolutions N to increase. If the number of revolutions N is increased by $\Delta n$, formulae (2) and (4) give $$V_0 = \frac{1}{2} V_{cc} - \frac{b\Delta\phi}{2R}(R + R2) + \frac{a\Delta n}{2R}(R + R1) \quad (5)$$

This implies that the displacement of the speed control voltage Vs opposite in sign to the displacement of the speed control voltage Vp is produced so that the displacement of the voltage $V_0$ on the motor 4 becomes smaller. In conclusion, the time interval from the moment at which the number of revolutions N has reached $N_0$ to the moment at which the phase $\theta$ reaches $\theta_0$ is elongated. Also because of the external disturbance, a control oscillation results.

As has been described above, when in controlling the speed and phase of rotation of a rotator, it was difficult to establish the prescribed phase value of rotation soon after the speed of rotation became constant.

With the aforesaid problem in mind, it is an object of the present invention to provide a rotation control system for controlling the operation of a rotator to reach a given speed of rotation and further therefrom to reach a given phase of rotation during a reduced time from the start of rotation, and for ensuring good stability of control system operations.

Another object of the invention is to provide a VTR capable of starting recording or reproduction soon after the start of rotation of a rotary cylinder holding a head.

The additional objects and features of the present invention will become apparent from the following description of embodiments thereof by reference to the accompanying drawings.

SUMMARY OF THE INVENTION

In one form of the invention, a control system for a rotator includes a speed control means for controlling the speed of rotation of the rotator, phase control means for controlling the phase of rotation of the rotator, changeover means for changing over at least one of the control gain of the speed control means and the control gain of the phase control means in an indicated changeover period, and indication means for indicating the changeover period.

BRIEF DESCRIPTION OF THE DRAWINGS

FIG. 11 is a timing chart illustrating waveforms in various portions of the circuit of FIG. 10.

DETAILED DESCRIPTION OF THE PREFERRED EMBODIMENTS

Figure 1:
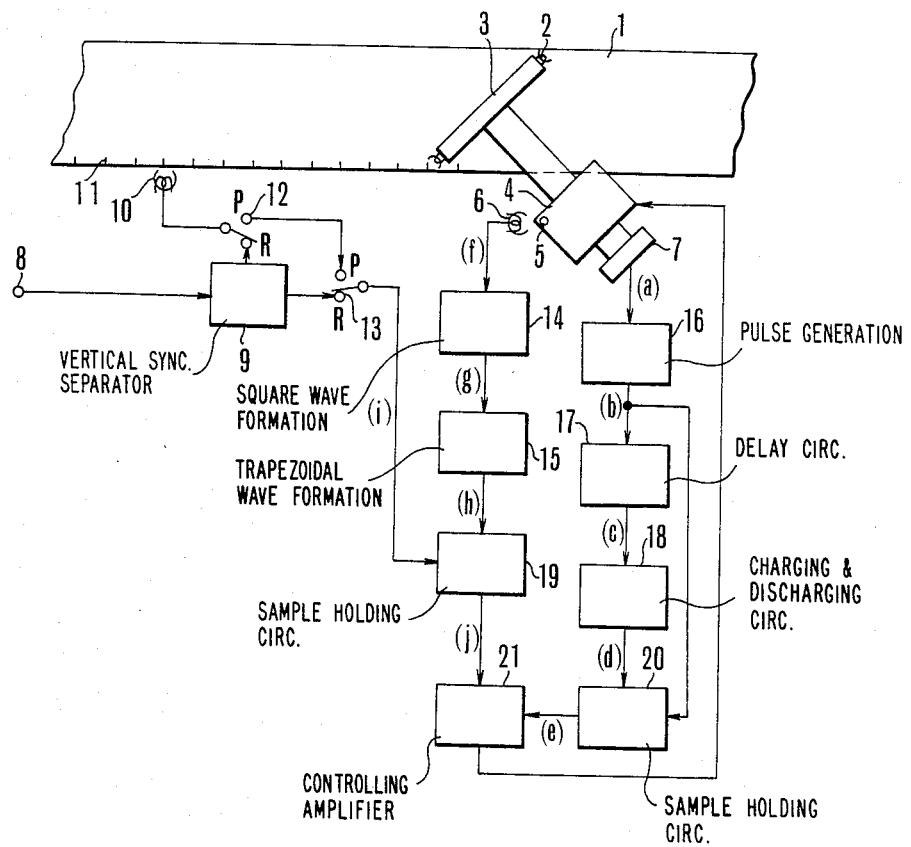
FIG. 1 illustrates an example of the system for controlling a rotary cylinder as the rotator in VTR.
Figure 2:
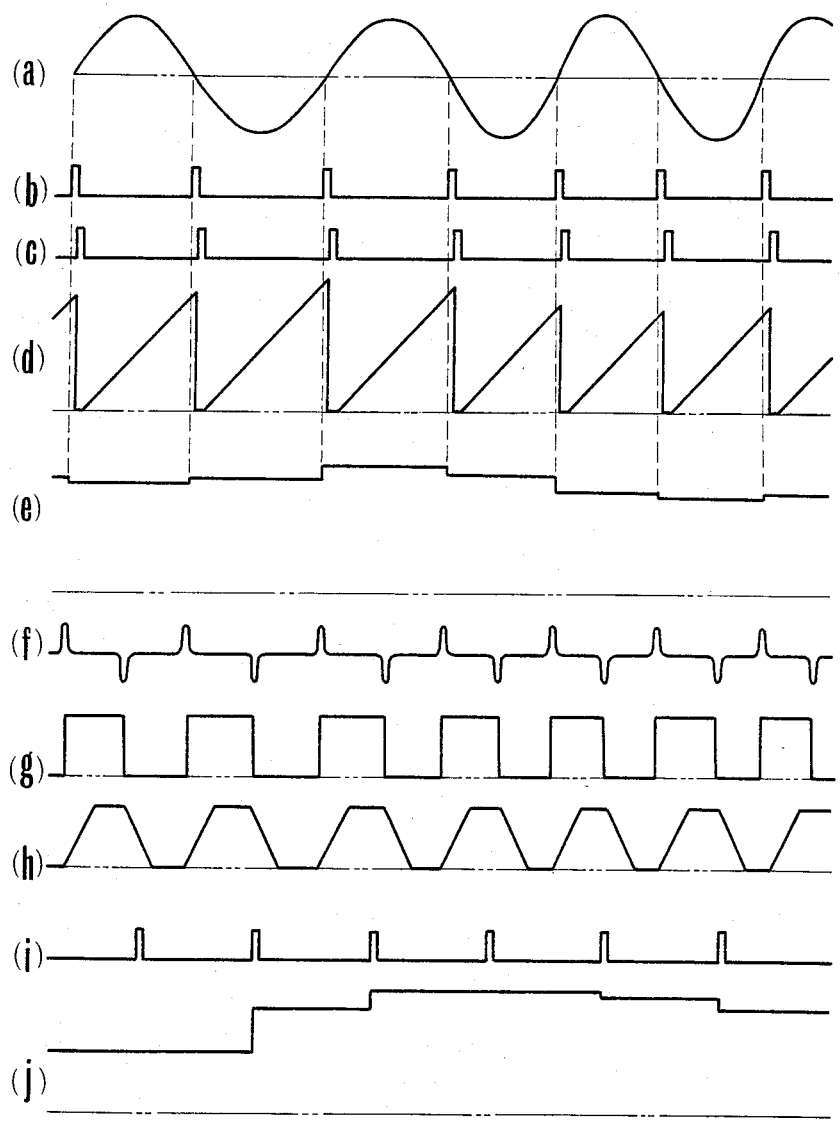
FIG. 2 is a timing chart illustrating waveforms in various portions of the system of FIG. 1.
Figure 3:
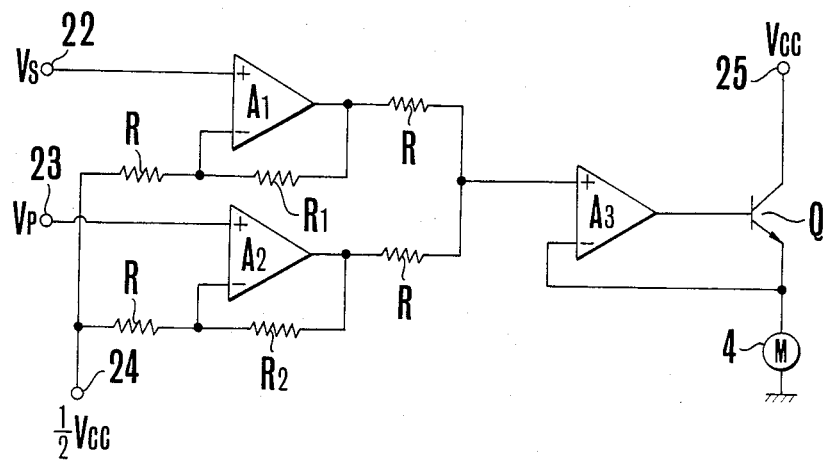
FIG. 3 is an electrical circuit diagram illustrating one conventional example of the main part of the system of FIG. 1.
Figure 4:
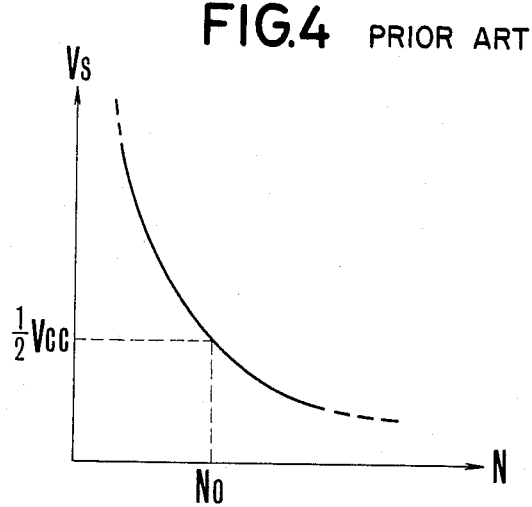
FIG. 4 is a graph of the characteristic curve illustrating the relation between the number of revolutions of the cylinder and the rotator and the speed control voltage.
Figure 5:
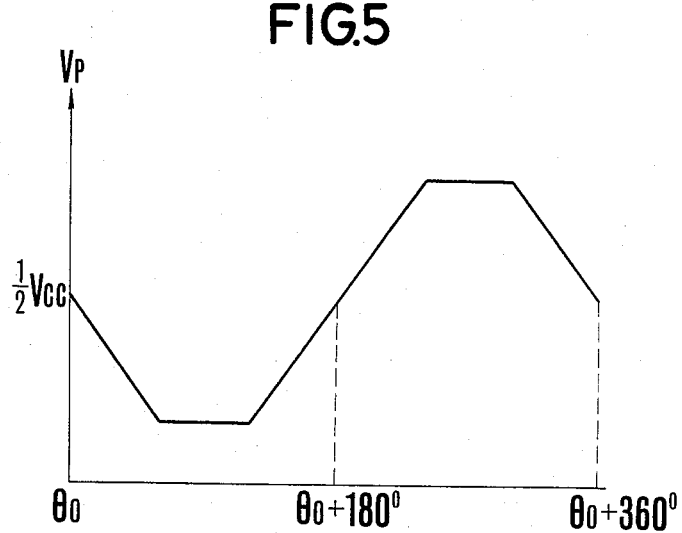
FIG. 5 is a graph of a characteristic curve illustrating the relation between the phase of rotation of the cylinder and the rotator and the phase control voltage.
Figure 6:
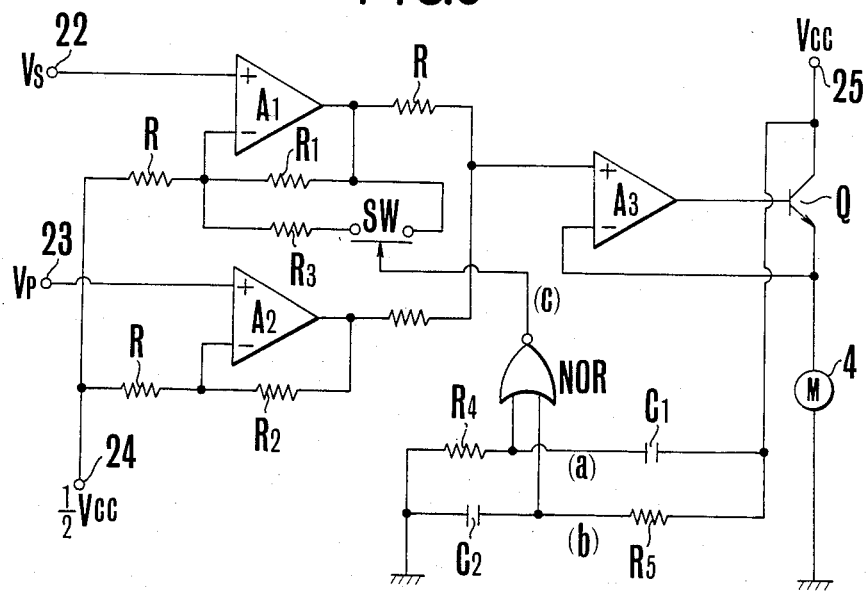
FIG. 6 is an electrical circuit diagram illustrating an embodiment of the main part of the system according to the present invention.
Figure 7:
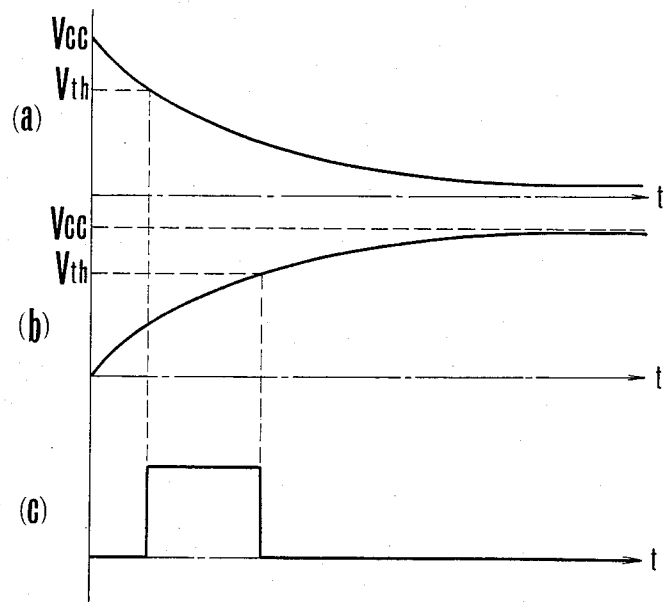
FIG. 7 is a timing chart illustrating waveforms in the various portions of the circuit of FIG. 6.

FIG. 6 illustrates an embodiment of the essential portion of the system according to the present invention. The same reference numerals and symbols have been employed to denote similar constituent parts to those shown in FIG. 3. As to the other portions of the system of the invention than those shown in FIG. 6, when in application to, for example, VTR, the system shown in FIG. 1 may be employed. Reference symbols R3-R5 identify resistors; reference symbols C1 and C2 identify condensers; a NOR gate of known construction is identified by the reference symbols NOR; an analog switch SW is responsive to the output of the NOR gate NOR to open and close. FIG. 7 is a timing chart illustrating waveforms in various portions (a) to (c) of the circuit of FIG. 6. In FIG. 7, reference symbols Vth identify a threshold voltage of the NOR gate NOR. The NOR gate NOR does not produce output when at either one of the two input voltages is in excess of the threshold voltage Vth. That is, the output becomes low (hereinafter referred to as "L") level. When the rotary cylinder 3 starts motion, the constant voltage Vcc is applied to the terminal 25. Then, the voltage in portion (a) of FIG. 6 becomes the constant voltage Vcc, while the voltage in portion (b) is zero. Since, in this case, the voltage on portion (a) is higher than the threshold voltage Vth, the output of the NOR gate NOR becomes low level L. Furthermore, since an analog switch SW closes when the output of the NOR gate NOR is a high (hereinafter referred to as "H") level, it is in this situation that the analog switch SW is open. Thus, the speed control system gain is unchanged from that described in FIG. 3.

Then, at a time determined by the time constant due to a condenser C2 and a resistor R5, the voltage on portion (a) falls below the threshold level indicated as Vth in FIG. 7. Responsive to this, the NOR gate NOR changes its output (c) to H level, thereby the analog switch SW is closed. This leads to replacement of the arrangement R1 by a parallel resistor of resistors R1 and R3 with the result that the control gain of the speed control system is lowered.

Furthermore, after that, now the condenser C1 and a resistor R4 provide a time constant, at the end of which the voltage on portion (b) exceeds the threshold voltage level Vth. Therefore, the analog switch SW is opened again. Thus, the speed control system takes control gain.

It will be appreciated that the time constant by the condenser C2 and the resistor R5 and the other time constant by the condenser C1 and the resistor R4 are so properly chosen that the speed control system gain can be lowered for a period beginning with the attainment of the number of revolutions N to a value almost equal to $N_0$ and terminating at the attainment of the phase $\theta$ to a value almost equal to $\theta_0$. Thereby after the start of motion, when the number of revolutions N nears $N_0$, the speed control system gain changes to a smaller value with a decrease in the displacement of the speed control voltage Vs opposite in sign to that of the phase control voltage Vp in the 3rd term of formula (5), thereby giving the advantage that the interval from the moment at which the number of revolutions N has reached $N_0$ to the moment at which the phase $\theta$ reaches $\theta_0$ can be shortened. Another advantage arising from the return of the speed control system gain to the original one after the phase $\theta$ has reached $\theta_0$ is that there is no possibility of control oscillation occurring.

Figure 8:
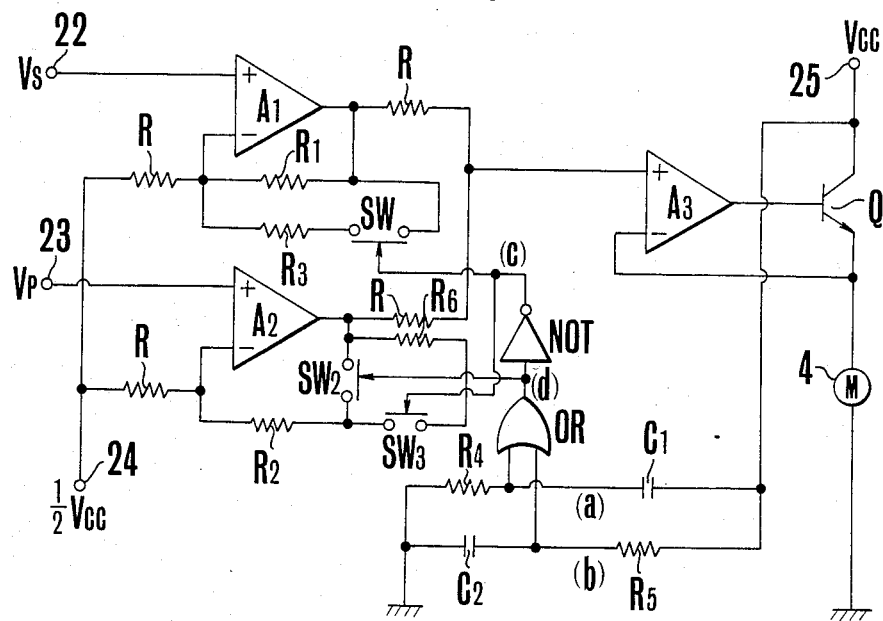
FIG. 8 is an electrical circuit diagram illustrating another embodiment of the main part of the system according to the present invention.
Figure 9:
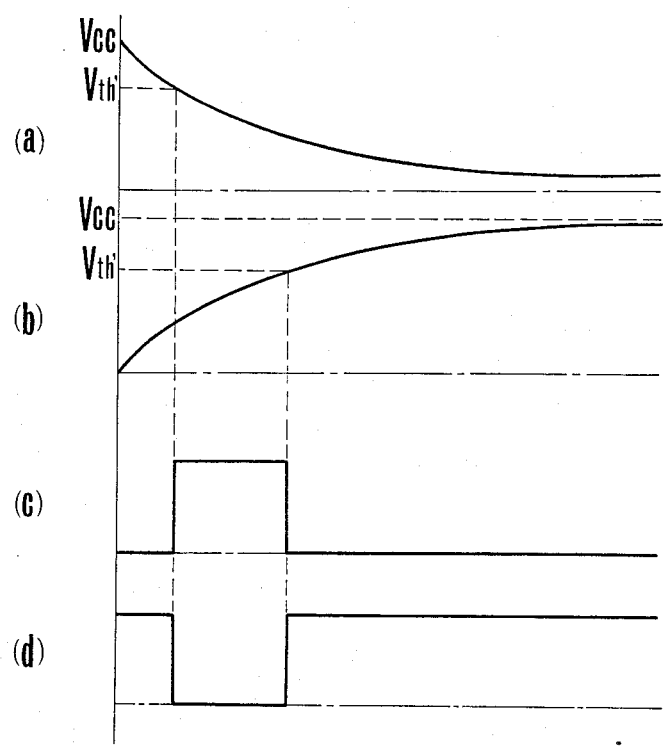
FIG. 9 is a timing chart illustrating waveforms in various portions of the circuit of FIG. 8.

FIG. 8 is an electrical circuit diagram illustrating another embodiment of the essential portion of the system according to the present invention, where the same reference characters have been employed to denote similar constituent parts to those shown in FIG. 6. Analog switches SW2 and SW3 are similar in construction to the aforesaid analog switch SW; reference symbols R6 identify a resistor; reference symbols NOT identify a known NOT circuit; reference symbols OR1 identify a known OR gate. FIG. 9 is a waveform diagram of signals (a) through (d) in the various portions of the circuit of FIG. 8. In FIG. 9, reference symbols Vth' identify a threshold voltage of an OR gate. After the drum 3 starts moving, it is within a time depending upon the time constant by the condenser C2 and the resistor R5 that the output (d) of the OR gate OR1 remains H level, and as a matter of course the output (c) of the NOT circuit NOT is at the low level L. After that, the output (d) of the OR gate OR1 changes to the low level L, and the NOT circuit NOT changes its output (c) to the high level H. Thereby the analog switch SW2 is opened, while the analog switches SW and SW3 are conversely closed. Thus, the resistor R1 is replaced by the parallel combination of the resistors R1 and R3, and the resistor R2 by the series combination of the resistors R2 and R6. Therefore, the gain of the speed control system is lowered, and the phase control system gain is heightened. In a time determined by the time constant by the condenser C1 and the resistor R4, the analog switch SW2 is closed gain, and the analog switches SW and SW3 are opened. Thus, the gains of the speed and the phase control systems are returned to the original ones. In this situation also, similar to that described in conjunction with FIG. 6, from the time at which the number of revolutions N nears $N_0$ onward, the speed control system gain is lowered until the phase nears $\theta_0$, while simultaneously the phase control system gain is heightened, thereby it is possible to further shorten the time during which the phase can reach $\theta_0$ after the number of revolutions N has reached $N_0$.

Figure 10:
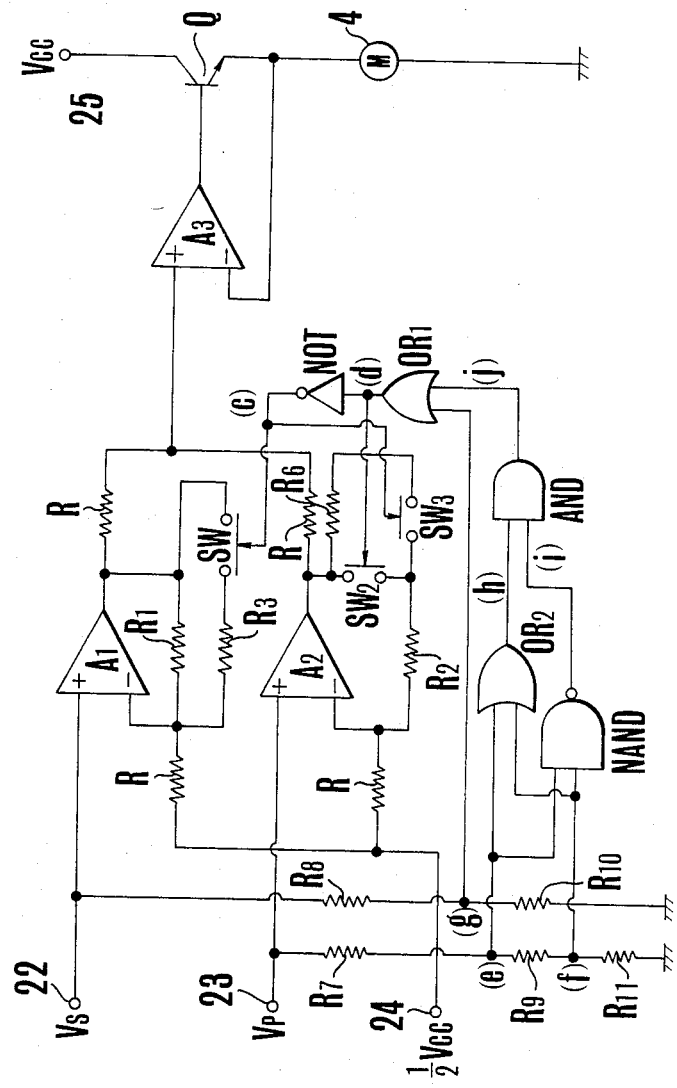
FIG. 10 is an electrical circuit diagram illustrating still another embodiment of the main part of the system according to the present invention.

FIG. 10 is an electrical circuit diagram illustrating still another embodiment of the essential portion of the system according to the present invention. The same reference symbols have been employed to denote similar constituent parts to those shown in FIG. 8. Reference symbols R7 through R11 identify resistors; reference symbols OR1 and OR2 identify OR gates; reference symbols NAND identify a known NAND gate; and AND identify a known AND gate. FIG. 11 is a waveform diagram of signals (c) through (j) in the various portions of the circuit of FIG. 10. Upon start of motion of the cylinder 3, the speed control voltage Vs approaches ½Vcc from the high value. Then, the voltage of signal (g) varies similar to the variation of the speed control voltage Vs as illustrated in FIG. 11, approaching R10Vcc/2(R8+R10). In this situation, the threshold voltae Vth' of the OR gate 1 is assumed to be preset slightly higher than R10Vcc/2(R8+R10), contributing to the detection of when the number of revolutions N reaches a value almost equal to $N_0$. Until then, the output (d) of the OR gate 1 remained at a high level H. For the phase control voltage Vp, after the start of motion of the cylinder 3, as has been described above, the voltage varies to a large extent for a short period, approaching ½Vcc after the number of revolutions N has reached $N_0$. The voltages of the signals (e) and (f)

also vary to a large extent for a short period after the start of motion similar to the phase control voltage Vp, as illustrated by hatching on lines (e) and (f) in FIG. 11. The voltages (e) and (f) approach $(R9+R11)Vcc/2(R7+R9+R11)$ and $R11Vcc/2(R7+R9+R11)$ respectively. In this situation, the threshold voltage Vth" of the OR gate 2 and the NAND gate NAND is assumed to be preset to a value near $(\frac{1}{2}R9+R11)Vcc/2(R7+R9+R11)$. Furthermore, the resistor R9 has a smaller value than those of the resistors R7 and R11. It then follows that when the voltage of the signal (e) is higher than the aforesaid level of the threshold voltage Vth", and when the voltage of the signal (f) is lower than the aforesaid level, the phase control voltage Vp has $\frac{1}{2}$Vcc. That is, the phase $\theta$ almost attains $\theta_0$. It is when the number of revolutions N nears $N_0$ that the voltages of the signals (e) and (f) are both either higher or lower than the aforesaid threshold voltage level Vth". Therefore, the AND gate AND produces the low level output L. Then when the $\theta$ nears $\theta_0$, either the voltage of the signal (e) exceeds the aforesaid threshold voltage level Vth", or the voltage of the signal (f) falls below the aforesaid threshold voltage level Vth". Therefore, at this time, the output of the AND gate AND changes from the low level L to the high level H. In short, the output (d) of the OR gate 1 is maintained at the high level H until the number of revolutions N nears $N_0$, then changes to the low level L and upon attainment of the phase $\theta$ to $\theta_0$ becomes a high level H. This implies the sequential detection of when the number of revolutions N nears $N_0$ and when the $\theta$ nears $\theta_0$. Thereby the speed and phase control system gains are changed in a more accurately timed relationship. The gains by the switching are the same as that described in FIG. 8.

It will be appreciated that as illustrated in FIGS. 6, 8 and 10, when the speed of rotation N of a rotator nearly reaches a prescribed value, the speed control system gain is smaller than that of the phase control system to ensure rapid attainment of the phase of rotation to a prescribed phase difference value. After that, by taking disturbance into account, the control gain returns to the original one.

As will be understood from the foregoing, when applying the present invention to VTRs, it is insured that the prescribed number of revolutions, and the prescribed phase of rotation, of the rotary cylinder can be quickly established after the start of motion thereof. Therefore, a VTR capable of quick recording or reproduction can be obtained.

As has been described above, according to the system of the present invention, the speed control system gain and the phase control system gain change in appropriately controlled timing with the advantage that the control period can be remarkably shortened without sacrificing the stability of operation control when starting the motion of the rotator.

What I claim:

1. A control system for a rotator, comprising:
  (a) feedback automatic speed control means for controlling the rotation speed of said rotator to a predetermined speed;
  (b) feedback automatic phase control means for controlling the rotation phase of said rotator to a predetermined phase;
  (c) changeover means for changing over at least one of a loop gain of said speed control means and a loop gain of said phase control means in a changeover period; and
  (d) changeover control means for controlling said changeover means in association with the rotation of the rotator.

2. A system according to claim 1, wherein said changeover means lowers the loop gain of said speed control means in the changeover period.

3. A system according to claim 1, wherein said changeover means increases the loop gain of said phase control means in the changeover period.

4. A system according to claim 1, wherein said changeover control means includes a clock circuit for counting time after the start of the rotator, the changeover period being determined by the clock circuit.

5. A system according to claim 1, wherein said changeover control means includes a first detecting circuit for detecting a signal relating to the rotation speed of the rotator, the changeover period being determined by said first detecting circuit.

6. A system according to claim 5, wherein said changeover control means further includes a second detecting circuit for detecting a signal relating to the rotating phase of the rotator, the changeover period being determined by said second detecting circuit.

7. A system according to claim 6, wherein the start of the changeover period is determined by the first detecting circuit and the end of the period is determined by the second detecting circuit.

8. A control system for a rotator, comprising:
  (a) feedback automatic speed control means for controlling the rotation speed of said rotator to a predetermined speed;
  (b) feedback automatic phase control means for controlling the rotation phase of the rotator to a predetermined phase;
  (c) changing means for changing at least one of a loop gain of said speed control means and a loop gain of said phase control means at a first time point after the start of the rotator and at a second time point after the first time point;
  (d) changing control means for controlling said changing means in association with the rotation of the rotator.

9. A system according to claim 8, wherein the loop gain of the speed control means is decreased by changing at the first time point.

10. A system according to claim 9, wherein the loop gain of the speed control means is increased by changing at the second time point.

11. A system according to claim 10, wherein the loop gain of the speed control means returns to the loop gain before the first time point by changing at the second time point.

12. A system according to claim 10, wherein the loop gain of the phase control means is increased by changing at the first time point.

13. A system according to claim 12, wherein the loop gain of the phase control means is decreased by changing at the second time point.

14. A system according to claim 13, wherein the loop gain of the phase loop means is restored to the control gain before the first time point by changing at the second time point.

15. A system according to claim 8, wherein said changing control means includes a clock circuit for counting the time from the start of the rotator, the first and second time points being determined by the clock circuit.

16. A system according to claim 8, wherein said changing control means includes a first detection circuit for detecting a signal relating to the rotation speed of the rotator, the first time point being determined by the first detection circuit.

17. A system according to claim 16, wherein said changing control means includes a second detection circuit for detecting a signal relating to the rotation speed of the rotator, the second time point being determined by the second detection circuit.

18. A control system for a rotator, comprising:
(a) speed detection means for detecting the speed of rotation of the rotator;
(b) first generation means for generating a speed control signal for controlling the rotation speed to a predetermined speed in correspondence to an output of the speed detection means;
(c) phase detection means for detecting the phase of rotation of the rotator;
(d) second generation means for generating a phase control signal for controlling the rotation speed to a predetermined phase in correspondence to an output of the phase detection means;
(e) first amplifying means for amplifying the speed control signal;
(f) second amplifying means for amplifying the phase control signal;
(g) mixing means for mixing an output signal of the first amplifying means with an output signal of the second amplifying means;
(h) driving means for control-driving the rotator in correspondence to an output signal of the mixing means;
(i) changing means for changing at least one of an amplification gain of the first amplifying means and an amplification gain of the second amplifying means at a first time point after the start of the rotator and at a second time point after the first time point; and
(j) changing control means for controlling said changing means in association with the rotation of the rotator.

19. A system according to claim 18, wherein the changing means decreases the amplification gain of the first amplifying means at the first time point.

20. A system according to claim 19, wherein the changing means increases the amplification gain of the first amplifying means at the second time point.

21. A system according to claim 20, wherein the changing means returns the amplification gain of the first amplifying means to the amplification gain before the first time point by the changing at the second time point.

22. A system according to claim 21, wherein the changing means increases the amplification gain of the second amplifying means at the first time point.

23. A system according to claim 22, wherein the changing means returns the amplification gain of the second amplifying means to the amplification gain before the first time point by the changing at the second time point.

24. A system according to claim 18, wherein the changing control means includes a clock circuit for counting time from the start of the rotator, the first and second time points being determined by the clock circuit.

25. A system according to claim 18, wherein the changing control means determines the first time point in correspondence to the speed control signal.

26. A system according to claim 25, wherein the changing control means determines the second time point in correspondence to the phase control signal.

27. A video tape recorder comprising:
(a) speed detection means for detecting the speed of rotation of a rotary member having a recording and/or reproducing head;
(b) first generation means for producing a speed control signal for controlling said speed of rotation to a prescribed one in in correspondence to the output of said speed detection means;
(c) phase detection means for detecting the phase of rotation of said rotary member;
(d) second generation means for producing a phase control signal for controlling said phase of rotation to a prescribed one in correspondence to the output of said phase detection means;
(e) first amplifying means for amplifying the speed control signal;
(f) second amplifying means for amplifying the phase control signal;
(g) mixing means for mixing an output signal of the first amplifying means with an output signal of the second amplifying means;
(h) driving means for controlling the driving of said rotary member in correspondence to an output signal of said mixing means;
(i) changing means for changing at least one of an amplification gain of first amplifying means and an amplification gain of the second amplifying means at a first time point after the start of the rotary member and at a second time point after the first time point; and
(j) changing control means for controlling said changing means in association with the rotation of the rotator.

28. A recorder according to claim 27, wherein the changing means decreases the amplification gain of the amplifying means at the first time point.

29. A recorder according to claim 28, wherein the changing means returns the amplification gain of the first amplifying means to the amplification gain before the first time point by the changing at the second time point.

30. A recorder according to claim 29, wherein the changing means increases the amplification gain of the second amplifying means at the first time point.

31. A recorder according to claim 30, wherein the changing means returns the amplification gain of the first amplifying means to the amplification gain before the first time point by the changing at the second time point.

32. A recorder according to claim 27, wherein the changing control means includes a clock circuit for counting time from the start of the rotary member, the first and second time points being determined by the clock circuit.

33. A recorder according to claim 32, wherein the clock circuit includes a first time constant circuit for determining the first time point and a second time constant circuit for determining the second time point.

34. A recorder according to claim 27, wherein the changing control means determines the first time point in correspondence to the speed control signal.

35. A recorder according to claim 34, wherein the changing control means determines the second time point in correspondence to the phase control signal.

36. A control system for a rotator, comprising:
(a) speed detection means for generating a speed error signal to compare the speed of rotation of the rotator with a predetermined speed;
(b) phase detection means for generating a phase error signal to compare the phase of rotation of the rotator with a predetermined phase;
(c) feedback automatic speed control means for controlling the speed of rotation of the rotator to the predetermined speed based on the speed error signal;
(d) feedback automatic phase control means for controlling the phase of rotation of the rotator to the predetermined phase based on the phase error signal; and
(e) control means for controlling at least one of a loop gain of said speed control means and a loop gain of said phase control means based on the speed error signal.

37. A control system for a rotator, comprising:
(a) speed detection means for generating a speed error signal to compare the speed of rotation of the rotator with a predetermined speed;
(b) phase detection means for generating a phase error signal to compare the phase of rotation of the rotator with a predetermined phase;
(c) feedback automatic speed control means for controlling the speed of rotation of the rotator to the predetermined speed based on the speed error signal;
(d) feedback automatic phase control means for controlling the phase of rotation of the rotator to the predetermined phase based on the phase error signal; and
(c) control means for controlling at least one of a loop gain of said speed control means and a loop gain of said phase control means based on the phase error signal.

* * * * *